Oct. 19, 1943.   A. P. SCRITCHFIELD   2,332,350
SPRAY ATTACHMENT FOR HOSE
Filed Nov. 1, 1941
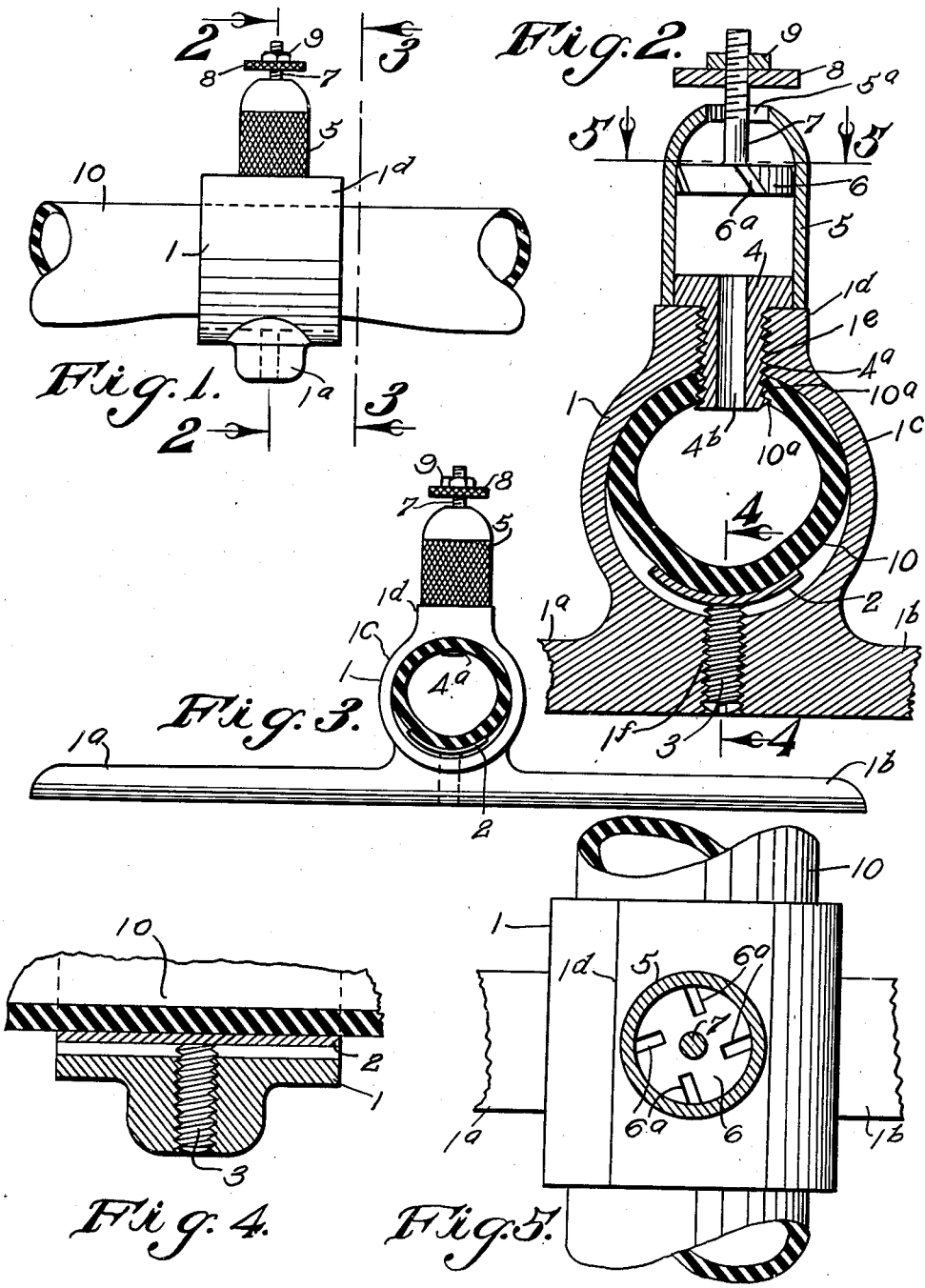
INVENTOR.
Albert P. Scritchfield
BY A. B. Bowman
ATTORNEY.

Patented Oct. 19, 1943

2,332,350

UNITED STATES PATENT OFFICE 2,332,350

SPRAY ATTACHMENT FOR HOSE

Albert P. Scritchfield, San Diego, Calif.

Application November 1, 1941, Serial No. 417,494

1 Claim. (Cl. 299—106)

My invention relates to an attachment to be readily secured to an ordinary garden hose in spaced relation to each other to form a row of fine sprays of water for watering lawns, gardens or the like and the objects of my invention are:

First, to provide an attachment of this class which provides means for holding the hose in close contact relation for securing the nozzle into one side therof and with provision for releasing the same after the nozzle attachment is made so that the hose has a full flow area at the nozzle connection; and Second, to provide an attachment of this class which is very simple and economical of construction, easy to install, efficient in its action and which will not readily deteriorate and get out of order.

With these and other objects in view as will appear hereinafter, my invention consists of certain novel features of construction, combination and arrangement of parts and portions as will be hereinafter described in detail and particularly set forth in the appended claims, reference being had to the accompanying drawing and to the characters of reference thereon which form a part of this application in which:

Figure 1 is a side elevational view of my spray attachment for hose shown on a fragmentary portion of a hose; Fig. 2 is an enlarged fragmentary sectional view taken from the line 2—2 of Fig. 1 showing parts and portions in elevation to facilitate the illustration; Fig. 3 is a side elevational view of the attachment shown on a sectional view of the hose taken from the line 3—3 of Fig. 1; Fig. 4 is a fragmentary sectional view taken from the line 4—4 of Fig. 2 showing portions in elevation to facilitate the illustration and Fig. 5 is a sectional view taken from the line 5—5 of Fig. 2.

Similar characters of reference refer to similar parts and portions throughout the several views of the drawing:

The supporting bracket 1, hose clamping plate 2, hose clamping screw 3, nozzle inlet plug 4, nozzle casing member 5, spray directing member 6, spray adjusting bolt 7, spray control member 8, lock nut 9 and hose 10 constitute the principal parts and portions of my spray attachment for hose.

The supporting bracket 1 is provided with two extended leg portions 1a and 1b which extend in opposite directions forming a base or support for the bracket to rest upon, as shown best in Fig. 3 of the drawing. Mounted at the middle of this base portion and extending upwardly is an annular hose supporting portion 1c which has an inner diameter slightly larger than the hose upon which it is to be mounted. It is provided in its upper side with an upwardly extending lug portion 1d which is provided with a central threaded portion 1e, as shown best in Fig. 2 of the drawing, which is adapted to receive the screw-threaded portion 4a of the nozzle inlet plug 4, shown best in Fig. 2 of the drawing. This bracket is provided at its lower side with a screw-threaded portion 1f which is adapted to receive the hose clamping screw 3 and positioned against the upper end of this screw 3 is the hose clamping plate 2, as shown best in Fig. 2 of the drawing. The nozzle inlet plug 4 is provided with a central opening 4b through which the water passes from the hose upwardly into the nozzle casing 5. This plug 4 is provided with an extended portion which is adapted to be screw-threaded into a hole 10a in the upper side of the hose 10, as shown best in Fig. 2 of the drawing. This plug 4 is secured in the lower end of a thimble shaped casing 5 by a press fit so that it is rigidly secured thereto. The upper end of this casing 5 is provided with a water outlet orifice 5a. Secured near the upper end of this nozzle casing 5 and fitted tightly therein by press fit is the spray directing member 6 which is a disk member provided with four angularly positioned slots 6a, as shown best in Figs. 2 and 5 of the drawing. Secured centrally on this member 6 is a spray adjusting bolt 7 which extends upwardly through the orifice 5a and is provided with a spray controlling member 8 which is a disk member screw-threaded on the bolt 7 and spaced some distance above the orifice 5a and this member 8 is secured in position by a lock nut 9 which is screw-threaded on the upper end of the bolt 7, all as shown best in Fig. 2 of the drawing.

The operation of my spray attachment for hose is substantially as follows: The bracket member 1 is secured in position over the hose in the position desired, it being noted that these brackets may be spaced various distances to provide for different spraying conditions and different water pressures. The bracket is placed over the hose after a hole has been made in the normally upper side of the hose adapted to receive the screw-threaded portions 4a of the nozzle inlet plug 4 and so positioned that the opening in the portion 1d coincides with the hole in the hose and the screw 3 is turned inwardly causing the plate 2 to rise, as shown in Fig. 2 of the drawing, pressing the hose at its upper side tightly against the inner upper side of the clamp member 1. Then the casing with the plug 4 is screw-threaded into the portion 1d of the member 1 and down into the opening in the hose 10 to the positon shown in Fig. 2 of the drawing, after which the screw 3 is released and permits the hose to recede to a substantially normal position. In case the spray is to be used for lawns or other normal purposes, the lock nut 9 and spray control member 8 are removed or not placed upon the bolt 7 and the spray is ready for normal operation, the water passing from the hose 10 through the orifice 4b through the slots 6a and then out around the bolt 7 through the nozzle opening 5a.

In case it is desired to irrigate roses or other plants that should not be sprayed on the stock or top portion, the spray control member 8 is adjustably positioned on the bolt and secured by the lock nut 9. Then the spray is forced to a more horizontal position outwardly in all directions and reducing its upward movement.

Though I have shown and described a particular construction, combination and arrangement of parts and portions, I do not wish to be limited to this particular construction, combination and arrangement, but desire to include in the scope of my invention the construction, combination and arrangement substantially as set forth in the appended claim.

Having thus described my invention, what I claim as new and desire to secure by Letters Patent is:

In a spray attachment for hose of the class described, the combination with a hose with an outlet orifice in its normally upper side, of a single piece bracket secured around said hose provided with an integral extended base portion at its lower side, a central opening in said base portion provided with screw threads, a bolt screw-threaded therein and a clamp plate positioned against the upper end of said bolt between said bracket and said hose, said bracket provided with an upwardly extending portion at its upper side provided with a screw-threaded central opening arranged to coincide with the opening in said hose.

ALBERT P. SCRITCHFIELD.